US007646672B2

(12) United States Patent
Klüver

(10) Patent No.: US 7,646,672 B2
(45) Date of Patent: Jan. 12, 2010

(54) METHOD FOR WAVEFIELD SEPARATION IN 3D DUAL SENSOR TOWED STREAMER DATA WITH ALIASED ENERGY IN CROSS-STREAMER DIRECTION

(75) Inventor: Tilman Klüver, Oslo (NO)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/009,440

(22) Filed: Jan. 18, 2008

(65) Prior Publication Data
US 2009/0185444 A1    Jul. 23, 2009

(51) Int. Cl.
*G01V 1/38* (2006.01)
(52) U.S. Cl. .......................................... 367/21; 367/24
(58) Field of Classification Search .................. 367/21, 367/24, 38, 43; 702/17
See application file for complete search history.

(56) References Cited

U.S. PATENT DOCUMENTS

| | | | |
|---|---|---|---|
| 4,486,865 | A | 12/1984 | Ruehle |
| 4,594,693 | A | 6/1986 | Pann et al. |
| 5,617,372 | A | 4/1997 | Gulunay et al. |
| 5,621,699 | A | 4/1997 | Rigsby et al. |
| 5,677,892 | A | 10/1997 | Gulunay et al. |
| 5,835,451 | A | 11/1998 | Soubaras |
| 5,995,904 | A * | 11/1999 | Willen et al. ................. 702/14 |
| 6,292,755 | B2 | 9/2001 | Chambers et al. |
| 2008/0089174 | A1 * | 4/2008 | Sollner et al. ................. 367/21 |

FOREIGN PATENT DOCUMENTS

| | | |
|---|---|---|
| EP | 0786671 | 7/1997 |
| WO | WO 00/57207 | 9/2000 |

OTHER PUBLICATIONS

N. Gulunay and R.E. Chambers, 1996, "Unaliased f-k domain trace interpolation (UFKI)", 66th Ann. Intl. Mtg., SEG, Expanded Abstracts, vol. 15, 1461-1464.
N. Gulunay and R.E. Chambers, 1997, "Generalized f-k domain trace interpolation", 67th Ann. Intl. Mtg., SEG, Expanded Abstracts, vol. 16, 1100-1103.
Necati Gulunay, 2003, "Seismic trace interpolation in the Fourier transform domain", Geophysics, SEG, vol. 68, No. 1, Jan.-Feb., 355-369.
T. Vladimirova, Eurasian Patent Office Search Report, Apr. 29, 2009.

* cited by examiner

*Primary Examiner*—Jack W. Keith
*Assistant Examiner*—Krystine Saito
(74) *Attorney, Agent, or Firm*—E. Eugene Thigpen; Charles R. Schweppe

(57) ABSTRACT

Pressure records and vertical particle velocity records from dual sensor towed streamer data are transformed to the inline wavenumber domain. A series of scaling filters are applied to the transformed vertical particle velocity records at each inline wavenumber, wherein each of the series of scaling filters is calculated for a different cross-streamer wavenumber range and in blocks of inline traces in which all seismic events are approximately linear. The pressure spectrum and the scaled vertical particle velocity spectrum are combined to separate upgoing and downgoing wavefield components. The separated upgoing and downgoing wavefield components are inverse-transformed back to the time-space domain.

24 Claims, 8 Drawing Sheets

METHOD FOR WAVEFIELD SEPARATION IN 3D DUAL SENSOR TOWED STREAMER DATA WITH ALIASED ENERGY IN CROSS-STREAMER DIRECTION

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine seismic data processing.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface which then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors (typically water pressure gradient sensors), particularly in marine surveys. Sometimes particle acceleration sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

The resulting seismic data obtained in performing the survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

Dual sensor towed streamer reflection seismic data consist of pressure field and vertical particle velocity field records. A central element in the processing chain of seismic data is its separation into records containing only the upgoing and downgoing components of the pressure wavefields. This separation can be performed after transforming the data into the frequency-wavenumber ($f$–$k_x$–$k_y$) domain, taking both the difference between and the sum of, respectively the frequency-wavenumber spectrum of the pressure record and a scaled version of the frequency-wavenumber spectrum of the vertical particle velocity record, and dividing the resulting spectra by two. (Note that, by simply using the inverse of the previous scaling filter, one could alternatively obtain the upgoing and downgoing components of the vertical particle velocity wavefields by taking a sum of and a difference between, respectively, the frequency-wavenumber spectrum of the vertical particle velocity record and a scaled version of the frequency-wavenumber spectrum of the pressure record, and dividing the resulting spectra by two.) Inverse-transformation from the frequency-wavenumber domain back to the time-space domain yields the desired upgoing and downgoing wavefield components. In this process, only the vertical particle velocity record (or alternatively, only the pressure record) is changed by scaling. For non-evanescent energy, it is scaled in the frequency-wavenumber domain by a real filter which systematically increases with increasing wavenumber for a given frequency. However, spatial aliasing in the cross-streamer direction is all too common in marine seismic surveys. The, in the case of cross-streamer aliasing, energy is wrapped to a lower cross-streamer wavenumber $k_y$. Subsequently, if these wrap-around effects in the wavenumber are not taken into account, then the scaling filter is computed from the wrong wavenumber, one that is too low. Thus, the aliased energy in the vertical particle velocity record (or alternatively, the pressure record) is scaled by filter coefficients that are consistently too low (or too high, respectively).

The superposition of upgoing and downgoing wavefield components in the original records causes a specific pattern of receiver ghost notches in the corresponding frequency-wavenumber spectra. Whenever the recorded energy is cancelled at a specific frequency-wavenumber combination in, for example, the spectrum of the pressure field, the corresponding recorded energy is maximal in the spectrum of the vertical particle velocity. However, this correspondence causes an incorrect separation of the upgoing and downgoing wavefield components at the notches in the frequency wavenumber spectrum of the pressure record (or, alternatively, the vertical particle velocity record). At these locations, the aliased energy is incorrectly scaled for the vertical particle velocity record (or alternatively, the pressure record), so that the resulting separated wavefield components are incorrectly computed.

Thus, a need exists for a method for separation of upgoing and downgoing wavefield components in 3D dual sensor towed streamer seismic data, which properly handles aliased energy in the cross-streamer direction.

BRIEF SUMMARY OF THE INVENTION

The invention is a method for separating upgoing and downgoing wavefield components in 3D dual sensor towed streamer data, which may have aliased energy in the cross-streamer direction. Pressure records and vertical particle velocity records from the streamer data are transformed to the inline wavenumber domain. A series of scaling filters are applied to the transformed vertical particle velocity records at each inline wavenumber, wherein each of the series of scaling filters is calculated for a different cross-streamer wavenumber range and in blocks of inline traces in which all seismic events are approximately linear. The pressure spectrum and the scaled vertical particle velocity spectrum are combined to separate upgoing and downgoing wavefield components. The separated upgoing and downgoing wavefield components are inverse-transformed back to the time-space domain.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

Before the vertical particle velocity record can be correctly scaled for wavefield separation, its spectrum needs to be properly dealiased. A conventional way to achieve this goal is trace interpolation in the cross-streamer direction in order to decrease the streamer spacing and, subsequently, increase the cross-streamer Nyquist wavenumber. The method of the invention provides an alternative approach for proper handling of aliased energy during wavefield separation, but without the need for explicit trace interpolation.

The method of the invention uses the cyclic properties of the fast Fourier transform (FFT). However, no interpolated trace needs to be calculated for the wavefield separation. Instead, several scaling filters are applied to the original spectrum of the vertical particle velocity record at each inline wavenumber $k_x$. Each of these scaling filters is calculated for a different cross-streamer wavenumber range and acts only on that part of the energy in the spectrum which is, or, in the case of aliased energy, should be, in this wavenumber range. The wavefield separation in the method of the invention works in blocks defined in the inline dimension to contain only seismic events that are approximately linear. For simplicity and clarity of illustration only, the procedure is described for a single block in the following discussion.

Figure 1:
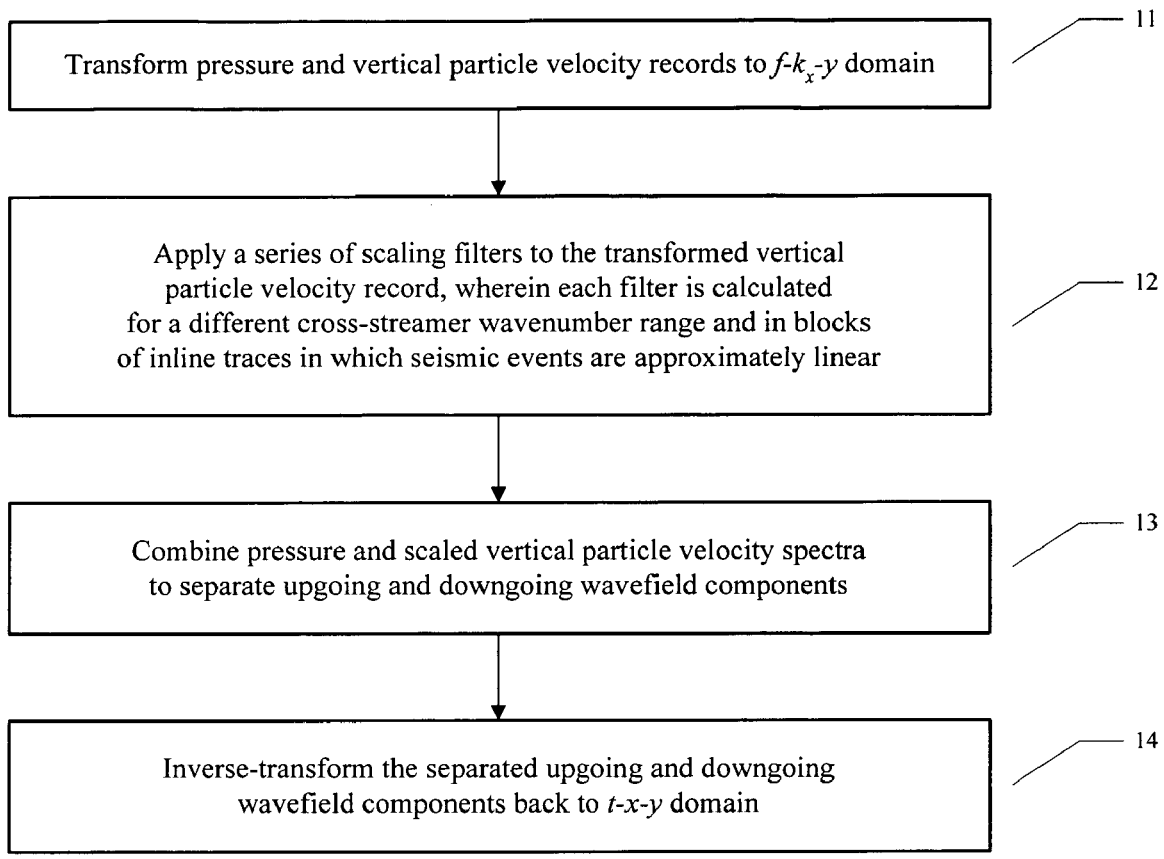
FIG. 1 is a flowchart illustrating the processing steps of a first embodiment of the method of the invention for separating upgoing and downgoing wavefield components in 3D dual sensor towed streamer data.
Figure 2:
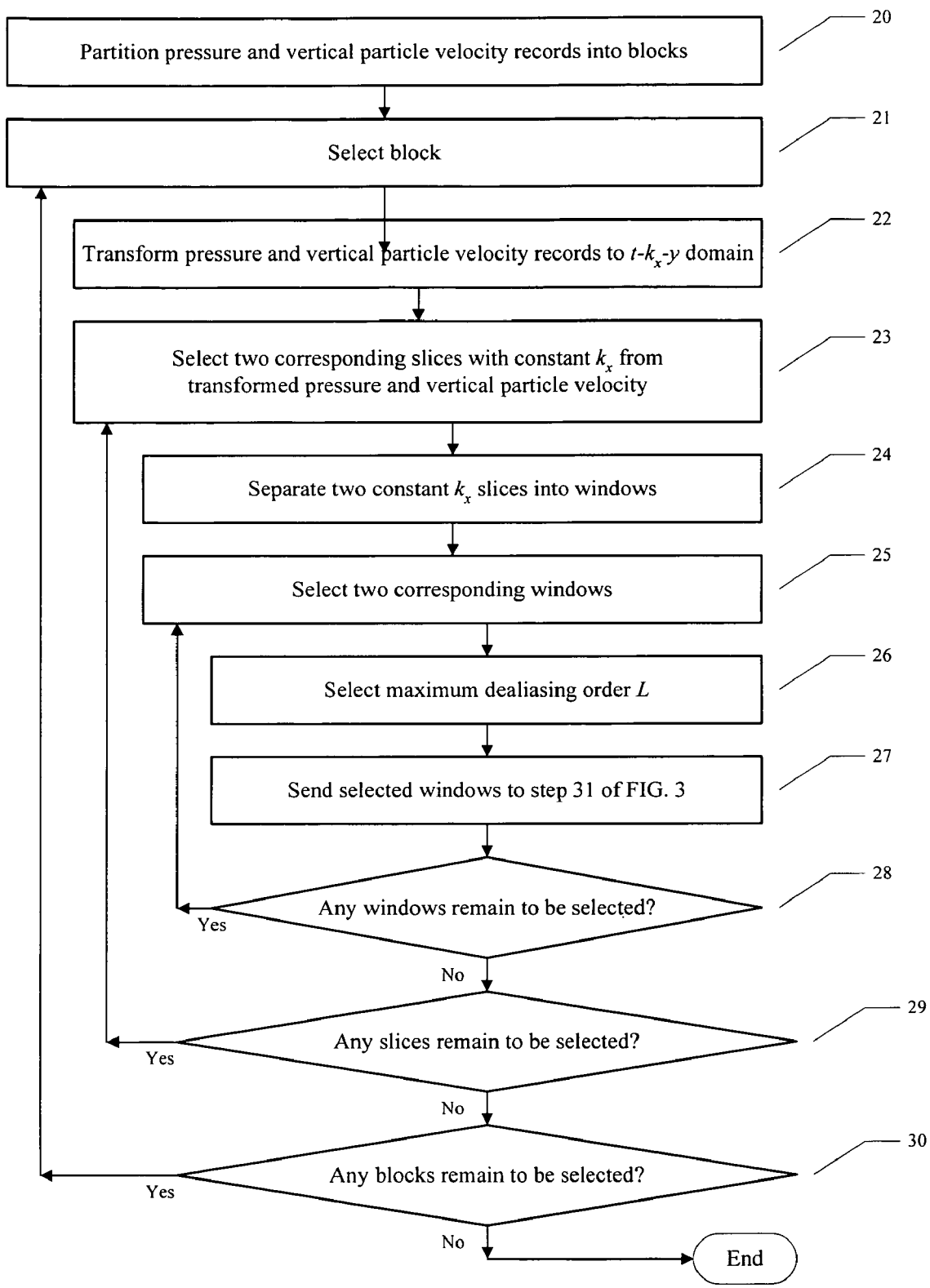
FIG. 2 is a flowchart illustrating the initial processing steps of a second embodiment of the method of the invention for separating upgoing and downgoing wavefield components in 3D dual sensor towed streamer data.
Figure 3:
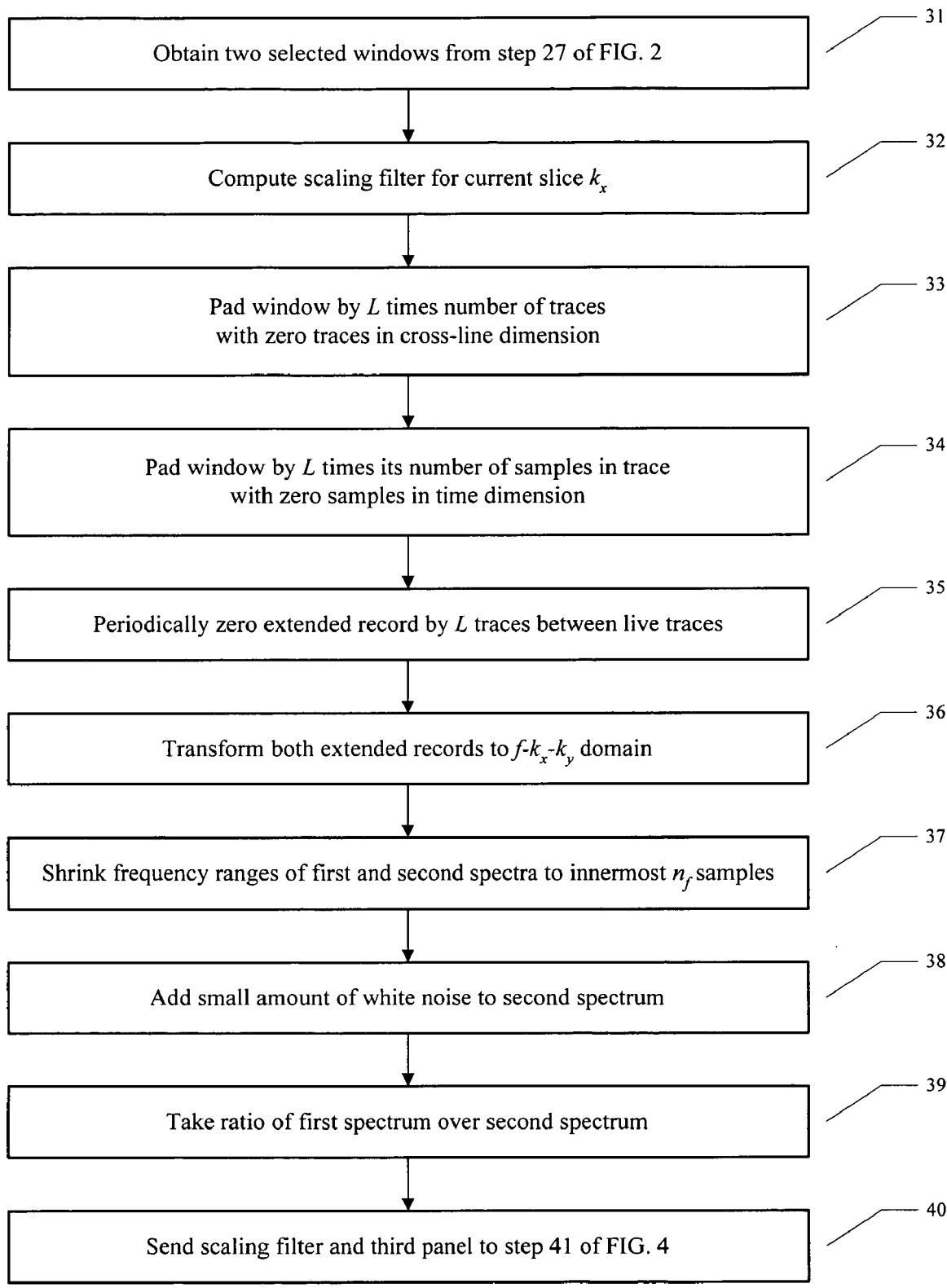
FIG. 3 is a flowchart illustrating the intermediate processing steps of an embodiment of the invention for processing windows from FIG. 2.
Figure 4:
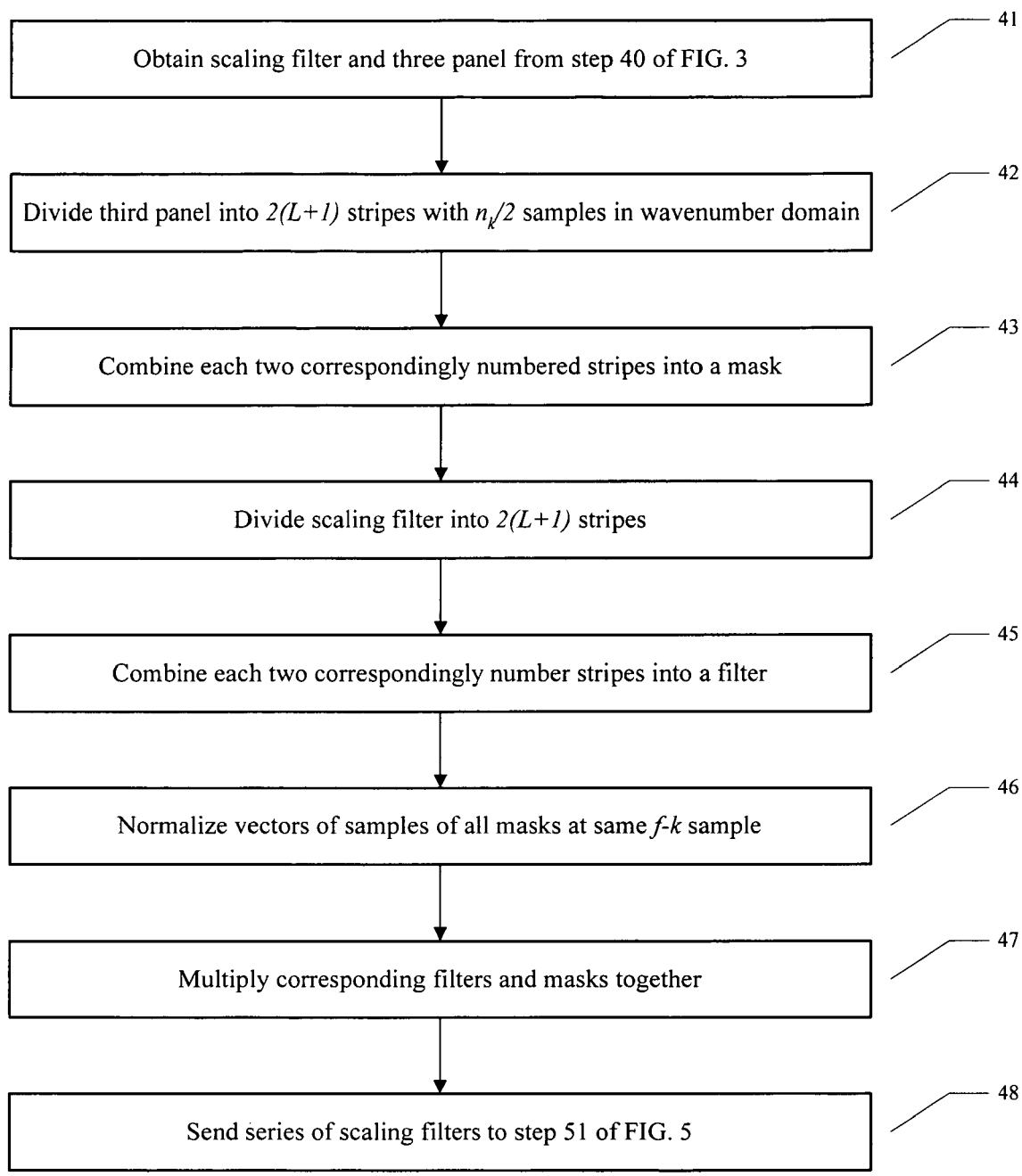
FIG. 4 is a flowchart illustrating the intermediate processing steps of an embodiment of the invention for processing spectral ratios from FIG. 3.
Figure 5:
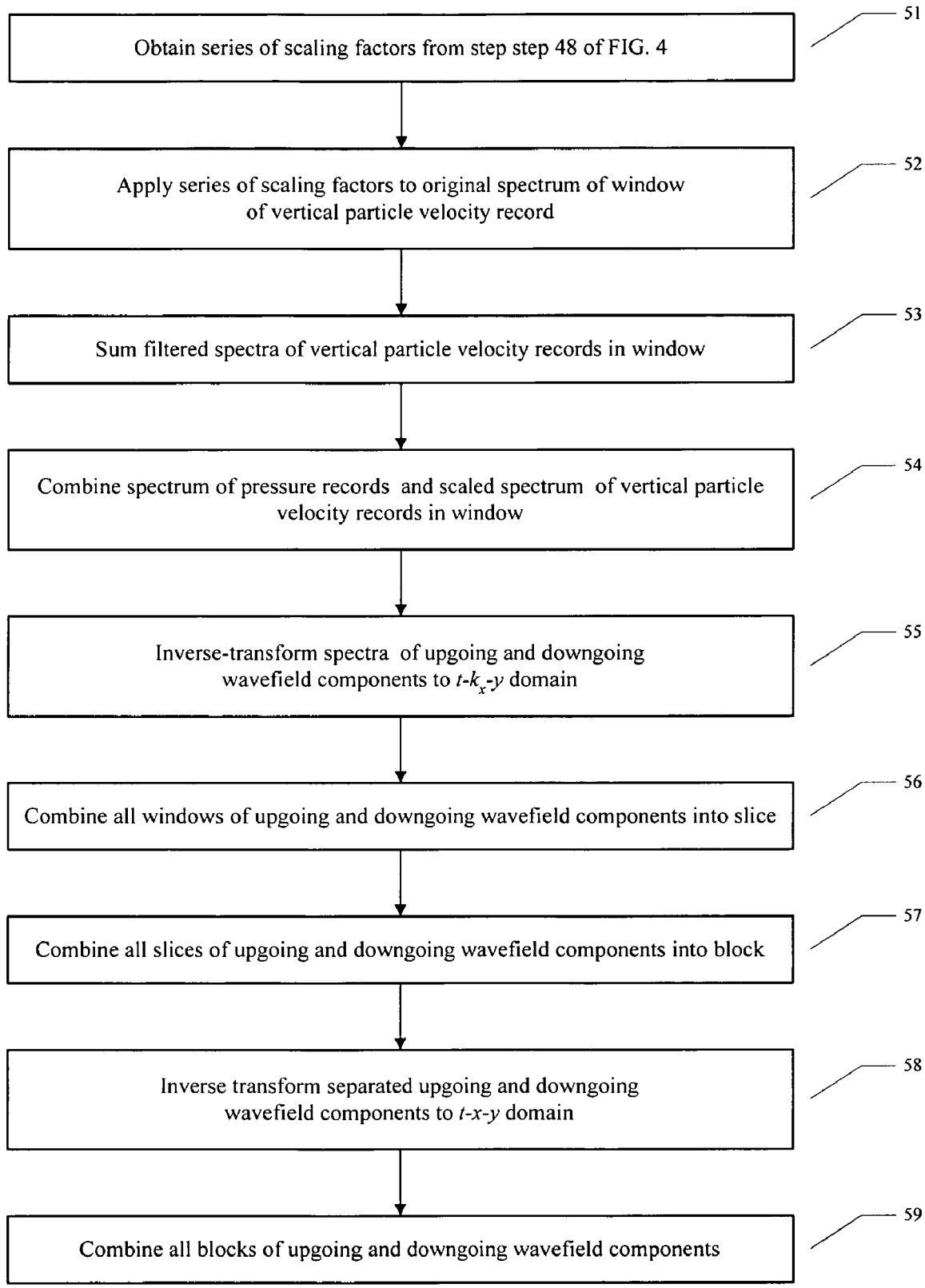
FIG. 5 is a flowchart illustrating the final processing steps of the second embodiment of the invention for separating upgoing and downgoing wavefield components in 3D dual sensor towed streamer data, as shown in FIGS. 1-4.

FIGS. 1-5 are flowcharts illustrating embodiments of the invention for wavefield separation. FIGS. 1 and 2-5 show two embodiments of the method of the invention, respectively. FIG. 2 shows the initial steps of the second embodiment of the method of the invention, FIGS. 3 and 4 show further intermediate steps of the method shown in FIG. 2, and FIG. 5 shows the final steps of the method shown in FIGS. 2-4.

Figure 6:
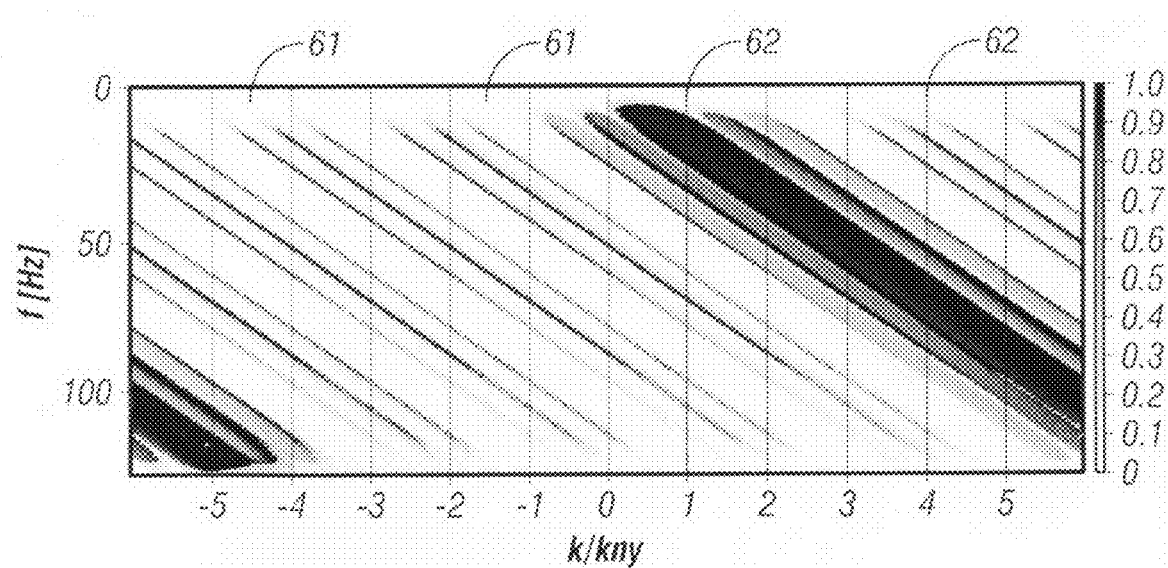
FIG. 6 shows a diagram illustrating an example third panel as used in the method of the invention.
Figure 7:
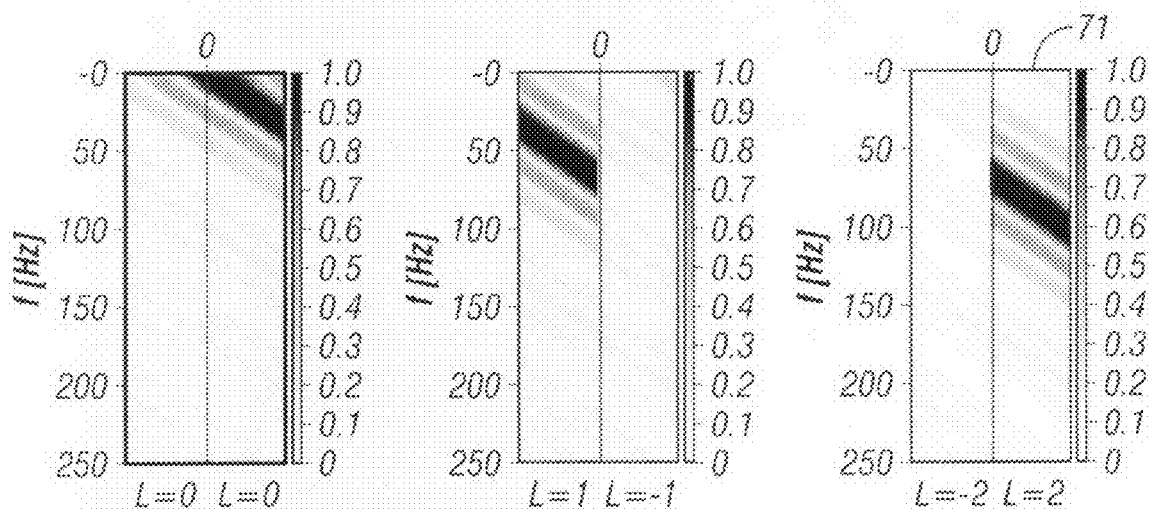
FIG. 7 shows a diagram illustrating masks created from the stripes in the example third panel in FIG. 6.
Figure 8:
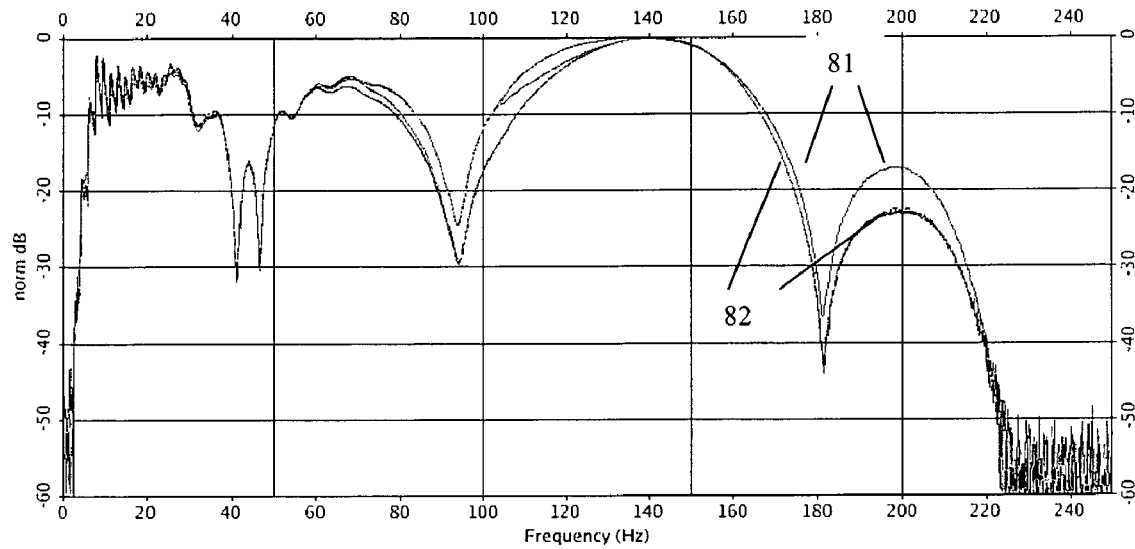
FIG. 8 shows a graph of the amplitude spectra of the reference trace compared with the results of the method of the invention for different maximum dealiasing orders L.
Figure 9:
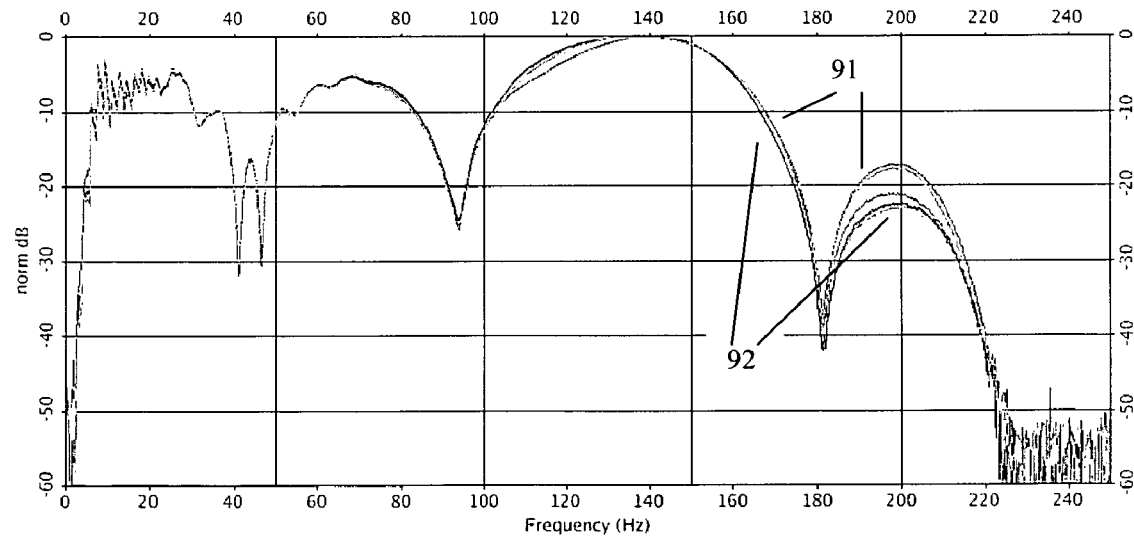
FIG. 9 shows a graph of the amplitude spectra of the reference trace compared with more results of the method of the invention for different maximum dealiasing orders L.
Figure 10:
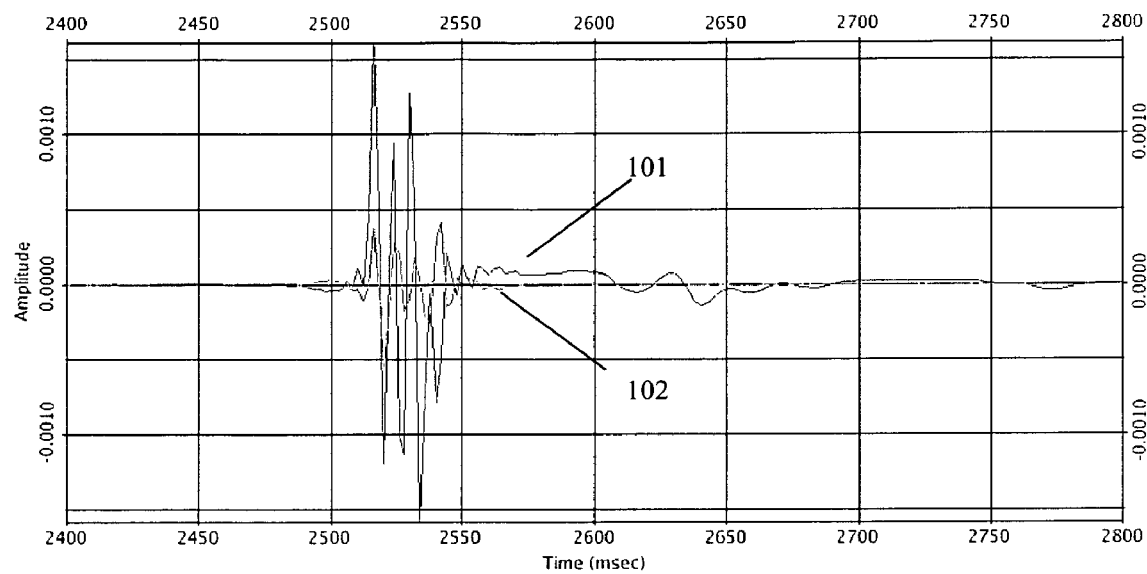
FIG. 10 shows a graph of the signal estimated by the method of the invention and its difference to the reference trace for dealiasing order L=0.
Figure 11:
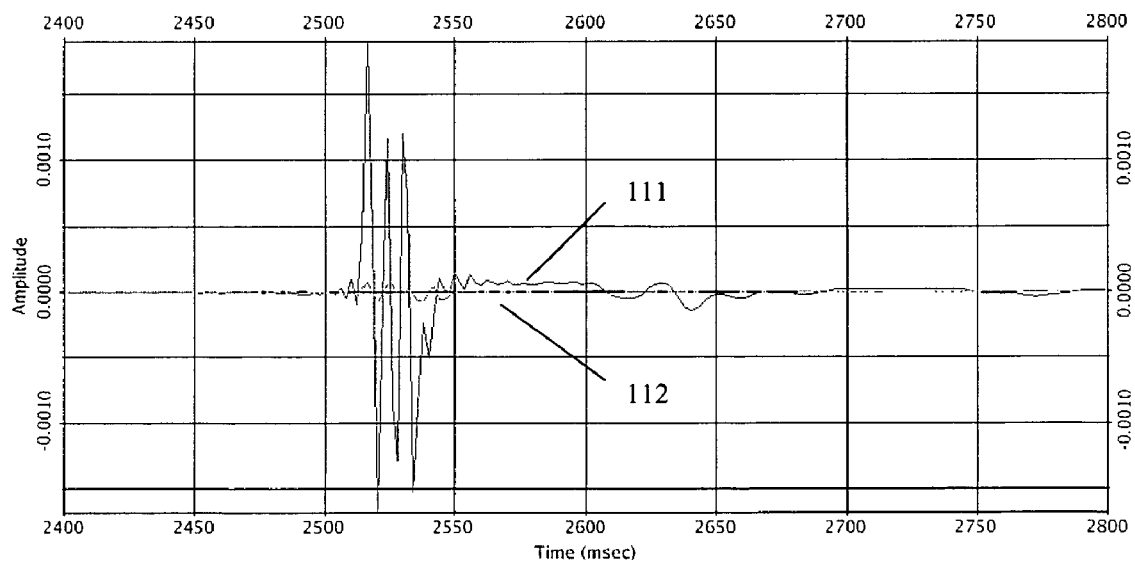
FIG. 11 shows a graph of the signal estimated by the method of the invention and its difference to the reference trace for dealiasing order L=5.

FIGS. 6-11 illustrate some of the steps described in the flowcharts discussed in reference to FIGS. 1-5. FIGS. 6 and 7 illustrate the spectral ratio, third panel, and its masks, respectively. FIGS. 8 and 9 illustrate comparison of amplitude spectra from the results of the method of the invention for different maximum dealiasing orders. FIGS. 10 and 11 illustrate the signal estimated by the method of the invention for dealiasing orders L=0 and 5, respectively.

FIG. 1 is a flowchart illustrating the processing steps of a first embodiment of the method of the invention for separating upgoing and downgoing wavefield components in 3D dual sensor towed streamer data. The streamer data may have aliased energy in the cross-streamer direction which will be handled by the method of the invention.

At step 11, pressure records and vertical particle velocity records from dual sensor towed streamer data are transformed from the time space (t–x–y) domain to the inline wavenumber (t–$k_x$–y) domain, where t denotes time, x and y are the inline and cross-streamer (crossline) dimensions, respectively, and $k_x$ is the inline wavenumber.

At step 12, a series of scaling filters are applied to the transformed vertical particle velocity records from step 11 at each inline wavenumber $k_x$. Thus, the scaling filters are applied to a slice of constant $k_x$. Each of the series of scaling filters is calculated for a different cross-streamer wavenumber range and in blocks of inline traces in which all seismic events are approximately linear. Each of the scaling filters acts only on the appropriate portion of the energy in the frequency-wavenumber spectrum which is in the corresponding wavenumber range for unaliased energy or should be in the corresponding wavenumber range for aliased energy.

At step 13, the pressure spectrum and the scaled vertical particle velocity spectrum from step 12 are combined to separate upgoing and downgoing wavefield components.

At step 14, the separated upgoing and downgoing wavefield components from step 13 are inverse-transformed back to the time-space (t–x–y) domain.

FIG. 2 is a flowchart illustrating the initial processing steps of a second embodiment of the method of the invention for separating upgoing and downgoing wavefield components in 3D dual sensor towed streamer data. The streamer data may have aliased energy in the cross-steamer direction. FIG. 2 expands upon the discussion of the first embodiment discussed above in reference to FIG. 1.

At step 20, pressure and vertical particle velocity records are partitioned into blocks in the time-space (t–x–y) domain. Each block comprises all traces in the cross-streamer (y) dimension and all trace sample points in the time (t) dimension. However, the block is limited in the inline (x) dimension so that all seismic events inside the block are approximately linear. Thus, the blocks may overlap in the inline dimension. When the blocks overlap, they have to be properly combined after the wavefield separation.

At step 21, a block from step 20 is selected.

At step 22, pressure and vertical particle velocity records in the block selected in step 21 are transformed from the t–x–y domain to the t–$k_x$–y domain.

At step 23, two slices, with constant $k_x$, one of a transformed vertical particle velocity record and one of a corresponding pressure record, both from step 22, are selected.

At step 24, the two slices, with constant $k_x$, selected in step 23 are separated into several windows which contain all the traces in the cross-streamer dimension, but not necessarily all the trace sample points in the time dimension. The windows may overlap in the time dimension. When the windows overlap, they have to be properly combined after the wavefield separation.

At step 25, two corresponding windows, one from the pressure record and one from the vertical particle velocity record, both from step 24, are selected.

At step 26, a maximum dealiasing order, an integer designated by L, is selected. The original cross-streamer wavenumber range corresponds to L=0.

At step 27, the windows selected in step 25 are sent to step 31 of FIG. 3 for further processing.

At step 28, it is determined if any further windows remain to be selected in step 25 in the slice with constant $k_x$ selected in step 23. If further windows remain to be selected, then the process returns to step 25. If no further windows remain to be selected, the process proceeds to the next step, 29.

At step 29, it is determined if any further slices with constant $k_x$ remain to be selected in step 23. If further slices remain to be selected, then the process returns to step 23. If no further slices remain to be selected, then the process proceeds to the next step, 30.

At step 30, it is determined if any further blocks remain to be selected in step 21. If further blocks remain to be selected, then the process returns to step 21. If no further blocks remain to be selected, the process ends for the flowchart in FIG. 2. The process now proceeds to the flowchart in FIG. 3.

FIG. 3 is a flowchart illustrating the processing steps of an embodiment of the method of the invention for processing windows from FIG. 2. Each such window is subject to the following procedure.

At step 31, two selected windows are obtained from step 27 of FIG. 2, one from a pressure record and one from a vertical particle velocity record.

At step 32, a scaling filter is computed to be applied in the wavefield separation for the current $k_x$ and for a desired cross-streamer wavenumber range which is L times larger than the Nyquist wavenumber range given by the data windows.

At step 33, the window from step 31 of the vertical particle velocity record is padded with L times its number of traces by zero traces in the cross-streamer dimension. Here, L is the maximum dealiasing order selected in step 26 of FIG. 2.

At step 34, the padded window from step 33 of the vertical particle velocity record is padded with L times its number of samples in a trace by zero samples in the time dimension, generating a first extended record. Here, L is the maximum dealiasing order selected in step 26 of FIG. 2.

At step 35, the first extended record from step 34 is periodically zeroed by L traces between every two live traces, generating a second extended record.

At step 36, the first and second extended windows of the vertical particle velocity records, from steps 34 and 35, respectively, are transformed from the inline wavenumber (t–$k_x$–y) domain to the frequency-wavenumber (f–$k_x$–$k_y$) domain. The spectrum of the first extended record from step 34 is referred to as the "first spectrum" in the following, while the spectrum of the second extended record from step 35 is referred to as the "second spectrum", respectively. The frequency and wavenumber ranges now have (L+1) times the number of samples as is present in the original spectra of the windows selected in step 25 of FIG. 2. The numbers of samples in the frequency wavenumber domain of the original spectra are referred to as $n_f$ for the frequency dimension and $n_k$ for the cross-streamer wavenumber dimension, respectively.

At step 37, the frequency ranges of both the first spectrum and the second spectrum from step 36 are shrunken, considering only the innermost $n_f$ samples for all wavenumbers.

At step 38, a small amount of white noise is added to the second spectrum, as shrunken, from step 37. This addition of white noise is to prevent problems if the second spectrum is small when used as a divisor in the next step, 39.

At step 39, the ratio is taken of the first spectrum from step 37 and the second spectrum from step 38. The resulting ratio of the first and second spectra is referred to as the "third panel" in the following.

At step 40, the scaling filter from step 32 and the third panel from step 39 are sent to step 41 of FIG. 4 for further processing. The process ends for the flowchart in FIG. 3 and the process now proceeds to the flowchart in FIG. 4.

FIG. 4 is a flowchart illustrating the intermediate processing steps of an embodiment of the method of the invention for processing spectral ratios from FIG. 3.

At step 41, the scaling filter and the third panel are obtained from step 40 of FIG. 3.

At step 42, the third panel from step 41 is divided into 2 times (L+1) stripes, each with $$\frac{n_k}{2}$$

samples in the wavenumber domain. The stripes are numbered from –L to L, that is, from negative L indices to positive L indices.

At step 43, each two corresponding stripes are combined into a mask, moving the stripe with a positive L index to the original positive wavenumber range and moving the stripe with a negative L index to the original negative wavenumber range. If L is odd, exchange the position of both stripes. In steps 42 and 43, (L+1) masks are created, each with $n_f$ times $n_k$ samples.

At step 44, the scaling filter from step 41 is divided into 2 times (L+1) stripes, each with $$\frac{n_k}{2}$$

samples in the wavenumber domain. The stripes are numbered from –L to L.

At step 45, each two corresponding stripes are combined into a filter, moving the strip with a positive L index to the original positive wavenumber range and moving the stripe with a negative L index to the original negative wavenumber range. If L is odd, exchange the position of both stripes. In steps 44 and 45, (L+1) filters are created, corresponding to the (L+1) masks created in steps 42 and 43, and acting on the different wavenumber ranges of the masks.

At step 46, all vectors consisting of the samples of all masks at the same frequency wavenumber sample are normalized. This normalization is necessary to ensure that extra energy is not introduced in the separated wavefields.

At step 47, the corresponding filters and masks are multiplied together to create the series of scaling filters.

At step 48, the series of scaling filters created in step 47 are sent to step 51 of FIG. 5 for further processing.

FIG. 5 is a flowchart illustrating the final processing steps of the second embodiment of the method of the invention for separating upgoing and downgoing wavefield components in 3D duel sensor towed streamer data, as shown in FIGS. 1-4.

At step 51, the series of scaling filters are obtained from step 48 of FIG. 4.

At step 52, the series of scaling filters from step 51 are applied to the original spectrum of the window of the vertical particle velocity record from step 25 of FIG. 2.

At step 53, all the resulting filtered spectra of the window of the vertical particle velocity records from step 52 are summed. This sum yields the scaled spectrum of the vertical particle velocity record in the window.

At step 54, the spectrum of the pressure record in the window from step 25 of FIG. 2 and the scaled spectrum of the vertical particle velocity record in the window from step 53 are combined. This yields the spectra of the upgoing and downgoing wavefields in the window.

At step 55, all the spectra of the upgoing and downgoing wavefields from step 54 are inverse-transformed from the frequency-wavenumber (f–$k_x$–$k_y$) domain to the inline wavenumber (t–$k_x$–y) domain.

At step 56, the inverse-transformed spectra from step 55 are combined for all the windows from step 24 of FIG. 2 in a slice of constant $k_x$. This combination yields the upgoing and downgoing wavefields in a slice.

At step 57, all the slices from step 56 containing the upgoing and downgoing wavefields calculated from the slices from step 23 of FIG. 2, are combined in a block. This combination yields the records of the upgoing and downgoing wavefields in a block in the t–$k_x$–y domain.

At step 58, the upgoing and downgoing wavefield components from step 57 are inverse-transformed from the inline wavenumber (t–$k_x$–y) domain back to the time-space (t–x–y) domain. This transformation yields the upgoing and downgoing wavefield components in the time-space domain in a block.

At step 59, the upgoing and downgoing wavefield components in a block obtained from step 58 are combined, yielding the final upgoing and downgoing wavefield components in the time-space domain.

The method of the invention can be further stabilized by calculating the series of masks for each window for the pressure record as well and combining it with the series for the vertical particle velocity record before the normalization step. In this way, common signals of both records are emphasized and the influence of random noise is reduced. The method aims to predict the ratio of aliased and non-aliased energy from its ratio at lower frequencies. The application of the method of the invention in time windows is desired as the method assumes a limited number of locally linear events.

The method of the invention is described above for the embodiment in which the vertical particle velocity record is scaled and the pressure record is not. Alternatively, the method of the invention includes the alternative embodiment in which the pressure record is scaled and the vertical particle velocity record is not. The above discussion can be modified in a straightforward manner to include this alternative embodiment. References to pressure records and to vertical particle velocity records would merely have to be exchanged.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; storage media such as disks and hard drives, and any other appropriate equipment).

Additionally, note that separating the upgoing and downgoing wavefield components, above in step 54 of FIG. 5, can be performed at any point after the series of scaling filters are applied to the vertical particle velocity spectrum in a window, above in step 52 of FIG. 5. Any resulting change in the order of steps is within the method of the invention.

The procedure of creating the masks and the effect of the proposed method is shown in the following figures. The used data have been forward modeled using 23 streamers with a distance of 25 m. The model consists of a single reflector with a dip of 60° in cross-streamer direction and no dip in streamer direction. The following figures show results for the slice with $k_x=0$. No windowing in the time dimension has been applied as the data contain only a single reflection event and the corresponding receiver ghost.

FIG. 6 is a diagram illustrating an example third panel as used in the method of the invention. FIG. 6 shows an example third panel after reduction to $n_f$ samples for each wavenumber. The stripes 61 which are used to build the masks are separated by vertical lines 62. The stripes are numbered and labeled from L=−5 to L=5.

FIG. 7 is a diagram illustrating masks created from the stripes in the example third panel in FIG. 6. FIG. 7 shows the stripes of FIG. 6 rearranged into masks 71 up to L=4. The masks are shown after normalization, which is step 46 in FIG. 4. Each mask has the same number of samples as the original spectrum of the vertical particle velocity record.

FIGS. 8-11 shows a comparison between the modeled ghost-free pressure field (reference) and the estimated one for trace number 11. FIG. 8 shows a graph of the amplitude spectra 81 of the reference trace compared with the results 82 of the method of the invention for different maximum dealiasing orders L. FIG. 9 shows a graph of the amplitude spectra 91 of the reference trace compared with more results 92 of the method of the invention for different maximum dealiasing orders L. The higher the chosen dealiasing order, the higher is the frequency up to which the spectrum of the estimated trace equals the spectrum of the reference trace.

FIG. 10 shows a graph of the signal 101 estimated by the method of the invention and its difference 102 to the reference trace for dealiasing order L=0. FIG. 11 shows a graph of the signal 111 estimated by the method of the invention and its difference 112 to the reference trace for dealiasing order L=5.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for converting 3D dual sensor towed streamer data into noise-attenuated data, comprising:

converting 3D dual sensor towed streamer data, representative of earth's subsurface and acquired by deploying a plurality of seismic sensors proximate an area of the earth's subsurface to be evaluated, the seismic sensors generating at least one of an electrical and optical signal in response to seismic energy, into scaled seismic data with aliasing noise attenuated, comprising:

transforming pressure records and vertical particle velocity records from the streamer data to the time-inline wavenumber-crossline space domain and applying a series of scaling filters to the transformed vertical particle velocity records at each inline wavenumber, wherein each of the series of scaling filters is calculated for a different cross-streamer wavenumber range and in blocks of inline traces in which all seismic events are approximately linear;

combining the transformed pressure records and the scaled vertical particle velocity records to separate upgoing and downgoing wavefield components; and inverse-transforming the separated upgoing and downgoing wavefield components back to the time-space domain, wherein the inverse-transformed upgoing wavefield component is the noise-attenuated data.

2. The method of claim 1, wherein transforming pressure records and vertical particle velocity records from the streamer data to the inline wavenumber domain comprises:

retrieving pressure records and vertical particle velocity records from pressure recorders and vertical particle velocity recorders, respectively, mounted in the towed streamer;

selecting a plurality of blocks in the streamer data with each block containing all traces in cross-streamer dimension, all trace sample points in time dimension, and only enough traces in the inline dimension so that all seismic events inside each block are approximately linear;

transforming pressure and vertical particle velocity records in each of the blocks to time-inline wavenumber-crossline space domain;

selecting a plurality of slices with constant inline wavenumber in each of the transformed blocks;

separating each slice into a plurality of windows with each window containing all traces in the cross-streamer dimension; and performing the following for each of the windows:
  selecting a maximum dealiasing order L for the window;
  computing a scaling filter for the inline wavenumber and for a selected range of cross-streamer wavenumbers;
  padding the window with zero traces and zero samples, generating a first extended record;
  periodically zeroing the first extended record with zero samples, generating a second extended record;
  transforming the first and second extended records to the frequency-wavenumber domain, generating a first and second spectrum, respectively;
  shrinking the first and second spectra; and
  taking the ratio of the first spectrum to the second spectrum, generating a third panel.

3. The method of claim 2, wherein the selected range of cross-streamer wavenumbers is L times larger than a Nyquist wavenumber range for the window.

4. The method of claim 2, wherein padding the window with zero traces and zero samples comprises:

padding the window with L times the number of traces in the window by zero traces in the cross-streamer dimension; and padding the window with L times the number of samples in a trace by zero samples in the time dimension.

5. The method of claim 2, wherein periodically zeroing the first extended record with zero samples comprises:
  periodically zeroing the second extended record by L traces between every two live traces.

6. The method of claim 2, wherein shrinking the first and second spectra comprises:
  shrinking the frequency ranges of the first and second spectra to the innermost samples with frequency range equal in size to the number of frequencies in the transformed vertical particle velocity records.

7. The method of claim 2, wherein taking the ratio of the first spectra to the second spectra comprises:
  adding a small amount of white noise to the second spectrum before dividing.

8. The method of claim 2, wherein applying a series of scaling filters comprises:
  dividing the third panel into 2(L+1) stripes numbered from −L to L;
  combining each two correspondingly-numbered stripes into a mask;
  dividing the scaling filter into 2(L+1) stripes numbered from −L to L;
  combining each two correspondingly-numbered stripes into a filter;
  normalizing the masks;
  multiplying the corresponding filters and masks together, generating a series of scaling filters; and
  applying the series of scaling filters to the transformed vertical particle velocity records.

9. The method of claim 8, wherein the each of the stripes comprises half the number of samples in the cross-streamer wavenumber dimension as in the transformed vertical particle velocity records.

10. The method of claim 8, wherein combining each two correspondingly-numbered stripes into a filter comprises
  moving the stripe with positive L to the positive wavenumber range;
  moving the stripe with negative L to the negative wavenumber range; and
  exchanging the position of the stripes if L is odd.

11. The method of claim 8, wherein normalizing the masks comprises:
  normalizing all vectors of samples on all masks at the same frequency-wavenumber sample.

12. The method of claim 8, wherein combining the pressure spectrum and the scaled vertical particle velocity spectrum comprises:
  summing all the filtered transformed vertical particle velocity records, generating the scaled vertical particle velocity spectrum in the window;
  combining the pressure spectrum and the scaled vertical particle velocity spectrum in the window, generating the spectra of the upgoing and downgoing wavefield components in the window;
  inverse-transforming the spectra of the upgoing and downgoing wavefield components from the frequency-wavenumber domain to the inline wavenumber domain;
  combining the inverse-transformed spectra of upgoing and downgoing wavefield components in all windows into the slice of constant $k_x$, generating the upgoing and downgoing wavefield components in a slice;
  combining the upgoing and downgoing wavefield components in all slices into the block, generating the upgoing and downgoing wavefield components in the block;
  inverse-transforming the upgoing and downgoing wavefield components in the block to the time-space domain; and
  combining the upgoing and downgoing wavefield components in all blocks, generating the separated upgoing and downgoing wavefield components.

13. A system for converting 3D dual sensor towed streamer data into noise-attenuated data, comprising:
  means for converting 3D dual sensor towed streamer data, representative of earth's subsurface, into scaled seismic data with aliasing noise attenuated, comprising:
    pressure recorders and vertical particle velocity recorders mounted in the towed streamer, recording pressure records and vertical particle velocity records, respectively;
    means for transforming pressure records and vertical particle velocity records from the streamer data to the time-inline wavenumber-crossline space domain; and
    means for applying a series of scaling filters to the transformed vertical particle velocity records at each inline wavenumber, wherein each of the series of scaling filters is calculated for a different cross-streamer wavenumber range and in blocks of inline traces in which all seismic events are approximately linear;
  means for combining the transformed pressure records and the scaled vertical particle velocity records to separate upgoing and downgoing wavefield components; and
  means for inverse-transforming the separated upgoing and downgoing wavefield components back to the time-space domain, wherein the inverse-transformed upgoing wavefield component is the noise-attenuated data.

14. The system of claim 13, wherein the means for transforming pressure records and vertical particle velocity records from the streamer data to the inline wavenumber domain comprises:
  means for selecting a plurality of blocks in the streamer data with each block containing all traces in cross-streamer dimension, all trace sample points in time dimension, and only enough traces in the inline dimension so that all seismic events inside each block are approximately linear;
  means for transforming pressure and vertical particle velocity records in each of the blocks to time-inline wavenumber-crossline space domain;
  means for selecting a plurality of slices with constant inline wavenumber in each of the transformed blocks;
  means for separating each slice into a plurality of windows with each window containing all traces in the cross-streamer dimension; and
  means for performing the following for each of the windows:
    means for selecting a maximum dealiasing order L for the window;
    means for computing a scaling filter for the inline wavenumber and for a selected range of cross-streamer wavenumbers;
    means for padding the window with zero traces and zero samples, generating a first extended record;
    means for periodically zeroing the first extended record with zero samples, generating a second extended record;
    means for transforming the first and second extended records to the frequency-wavenumber domain, generating a first and second spectrum, respectively;
    means for shrinking the first and second spectra; and
    means for taking the ratio of the first spectrum to the second spectrum, generating a third panel.

15. The system of claim 14, wherein the selected range of cross-streamer wavenumbers is L times larger than a Nyquist wavenumber range for the window.

16. The system of claim 14, wherein the means for padding the window with zero traces and zero samples comprises:
- means for padding the window with L times the number of traces in the window by zero traces in the cross-streamer dimension; and
- means for padding the window with L times the number of samples in a trace by zero samples in the time dimension.

17. The system of claim 14, wherein the means for periodically zeroing the first extended record with zero samples comprises:
- means for periodically zeroing the second extended record by L traces between every two live traces.

18. The system of claim 14, wherein the means for shrinking the first and second spectra comprises:
- means for shrinking the frequency ranges of the first and second spectra to the innermost samples with frequency range equal in size to the number of frequencies in the transformed vertical particle velocity records.

19. The system of claim 14, wherein the means for taking the ratio of the first spectra to the second spectra comprises:
- means for adding a small amount of white noise to the second spectrum before dividing.

20. The system of claim 14, wherein the means for applying a series of scaling filters comprises:
- means for dividing the third panel into 2(L+1) stripes numbered from –L to L;
- means for combining each two correspondingly-numbered stripes into a mask;
- means for dividing the scaling filter into 2(L+1) stripes numbered from –L to L;
- means for combining each two correspondingly-numbered stripes into a filter;
- means for normalizing the masks;
- means for multiplying the corresponding filters and masks together, generating a series of scaling filters; and
- means for applying the series of scaling filters to the transformed vertical particle velocity records.

21. The system of claim 20, wherein the each of the stripes comprises half the number of samples in the cross-streamer wavenumber dimension as in the transformed vertical particle velocity records.

22. The system of claim 20, wherein the means for combining each two correspondingly-numbered stripes into a filter comprises
- means for moving the stripe with positive L to the positive wavenumber range;
- means for moving the stripe with negative L to the negative wavenumber range; and
- means for exchanging the position of the stripes if L is odd.

23. The system of claim 20, wherein the means for normalizing the masks comprises:
- means for normalizing all vectors of samples on all masks at the same frequency-wavenumber sample.

24. The system of claim 20, wherein the means for combining the pressure spectrum and the scaled vertical particle velocity spectrum comprises:
- means for summing all the filtered transformed vertical particle velocity records, generating the scaled vertical particle velocity spectrum in the window;
- means for combining the pressure spectrum and the scaled vertical particle velocity spectrum in the window, generating the spectra of the upgoing and downgoing wavefield components in the window;
- means for inverse-transforming the spectra of the upgoing and downgoing wavefield components from the frequency-wavenumber domain to the inline wavenumber domain;
- means for combining the inverse-transformed spectra of upgoing and downgoing wavefield components in all windows into the slice of constant $k_x$, generating the upgoing and downgoing wavefield components in a slice;
- means for combining the upgoing and downgoing wavefield components in all slices into the block, generating the upgoing and downgoing wavefield components in the block;
- means for inverse-transforming the upgoing and downgoing wavefield components in the block to the time-space domain; and
- means for combining the upgoing and downgoing wavefield components in all blocks, generating the separated upgoing and downgoing wavefield components.

* * * * *